April 5, 1949. H. BOUTILLON 2,465,997
VOLUMETRIC LIQUID METER
Filed April 18, 1939 3 Sheets-Sheet 1
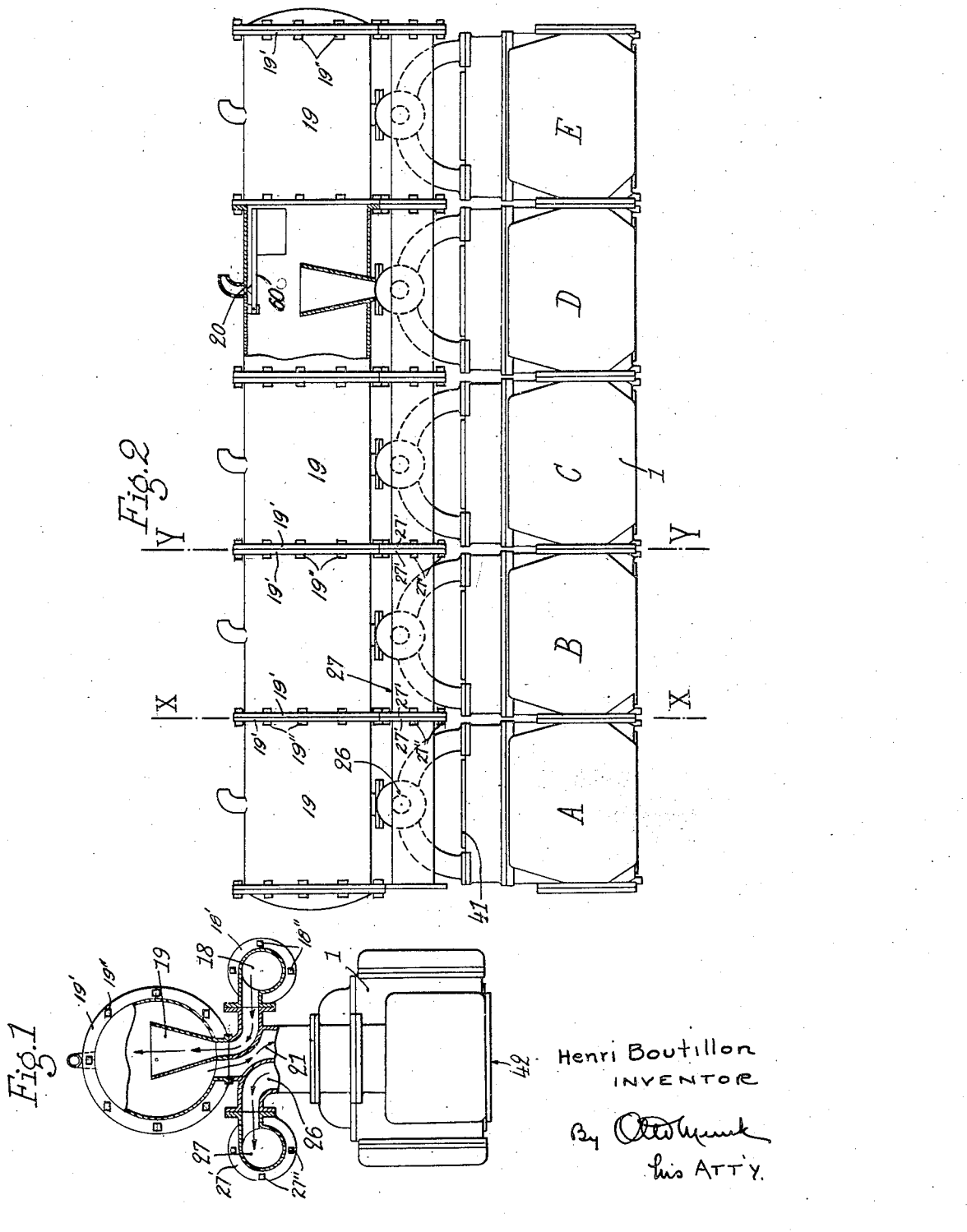
Henri Boutillon
INVENTOR April 5, 1949. H. BOUTILLON 2,465,997

VOLUMETRIC LIQUID METER

Filed April 18, 1939 3 Sheets-Sheet 2

Henri Boutillon
INVENTOR

By Otto Munk
his ATTY.

April 5, 1949. H. BOUTILLON 2,465,997
VOLUMETRIC LIQUID METER
Filed April 18, 1939 3 Sheets-Sheet 3
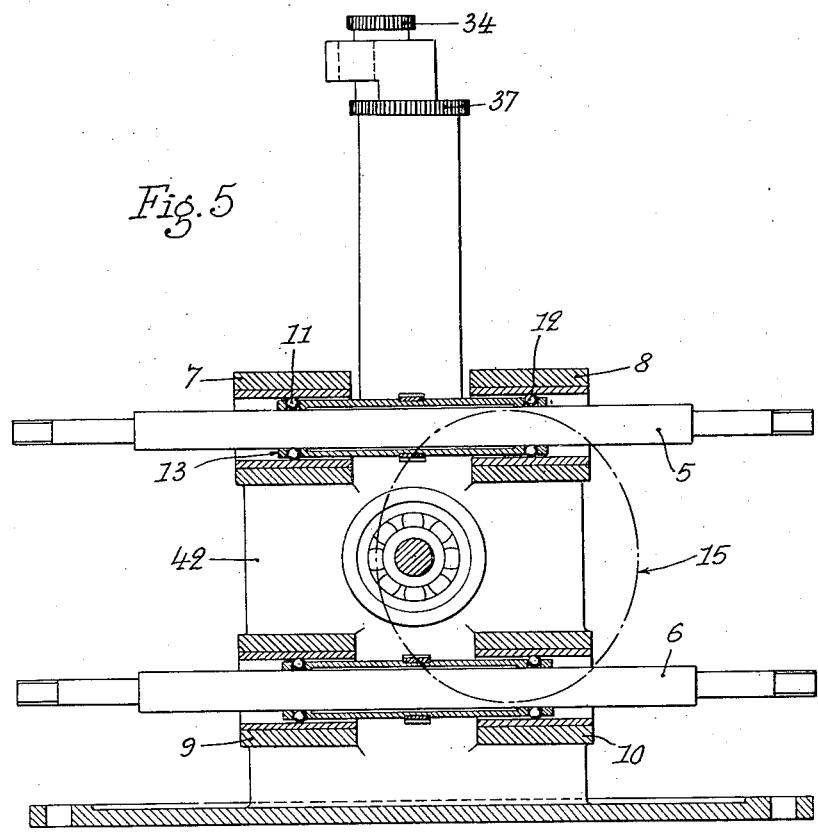
Henri Boutillon
INVENTOR
By Otto Munk
his ATTY.

Patented Apr. 5, 1949

2,465,997

UNITED STATES PATENT OFFICE 2,465,997

VOLUMETRIC LIQUID METER

Henri Boutillon, Suresnes, France; vested in the Attorney General of the United States Application April 18, 1939, Serial No. 268,499
In France July 5, 1938

Section 3, Public Law 690, August 8, 1946
Patent expires July 5, 1958

5 Claims. (Cl. 73—198)

The present invention relates to volumetric meters employed for the measurement of volumes of liquid at a high output.

Hitherto, use has been made of meters whose size corresponds to the output of liquid traversing the apparatus. A meter of large size cannot be employed for the measurement of small outputs, as it would be too expensive for such work, while on the other hand it would be inaccurate if it operated at an output much below its normal output. For this reason, it is customary to construct a series of meters in increasing sizes in order to correspond to the needs of the industries. The result is a considerable outlay for models and an expensive manufacture, owing to the construction of large models in reduced number.

Moreover, the gas or air separator, which is usually indispensable, must also be provided in several models of corresponding size. As a rule, the unit consisting of the combined meter and separator must be specially designed and realized in each case, the two apparatus being connected together by piping whose arrangement depends upon local conditions.

The present invention has for its object to provide a volumetric meter for liquids which is of an economical construction and is characterized by the fact that it consists of the juxtaposition, in sufficient number to obtain the necessary output, of units each of which forms a volumetric meter having a reduced output and complete in itself, said units being so arranged that they may be readily connected and that they operate in parallel upon the same piping.

Further characteristics of the said meter, as well as various details of construction of the unit meters, will be set forth in the following description.

In the accompanying drawings, which are given solely by way of example:

Fig. 1 is a side view, partly in section, of a meter consisting of five sections or unit meters.

Fig. 2 is a corresponding elevational view.

Fig. 5 is a vertical section, on a larger scale, of the aggregate of movable parts of a unit, which group is supposed to have been removed from the said unit.

Fig. 6 is a detail view of the actuating mechanism for a controlling slide-valve.

In the embodiment shown in Figs. 1 to 6, and as represented in Fig. 2, the meter consists of the identical units A, B, C, D, etc. assembled in number proportional to the desired output. Each unit comprises not only the measuring device, but also its accessories, such as the admission and discharge pipes, as well as the separator of the air and gas contained in the liquid, and all of such accessories are designed as sections having the same length as the measuring unit, and are assembled in junction planes XX, YY, etc., which are perpendicular to the longitudinal axis of the apparatus.

Figure 3:
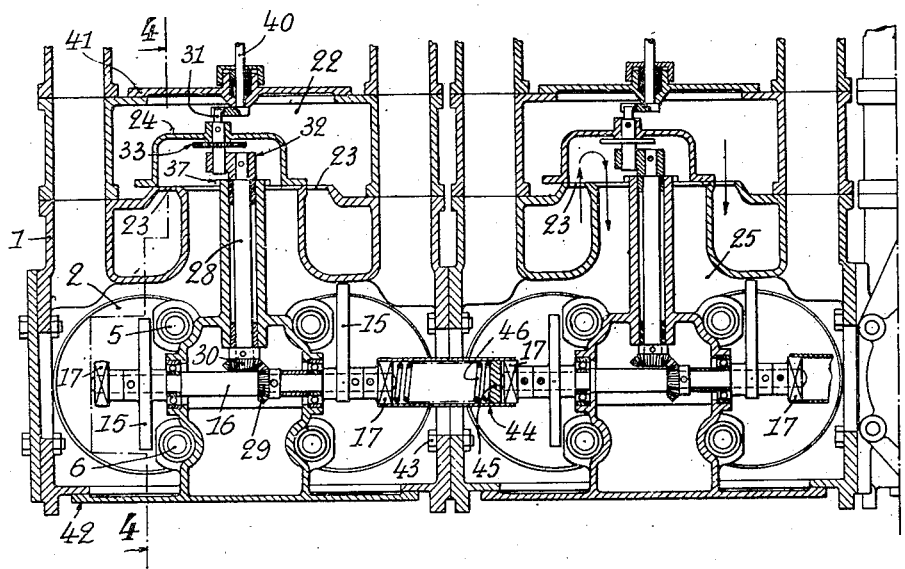
Fig. 3 is a vertical longitudinal section, on a larger scale, of two consecutive units.
Figure 4:
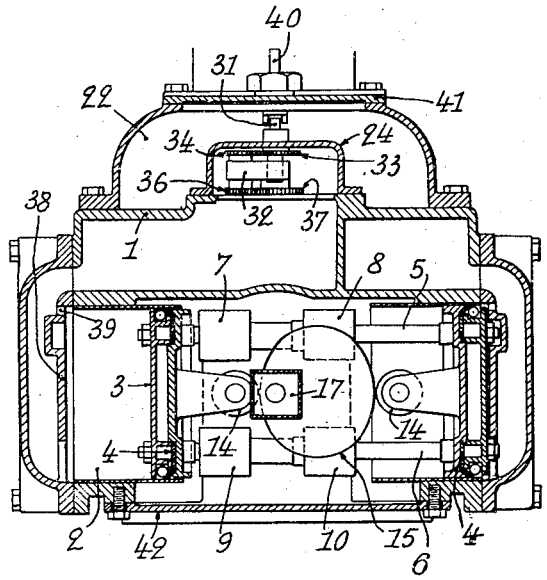
Fig. 4 is a cross-section on the line 4—4 of Fig. 3.

Each unit is preferably constructed as follows (Figs. 3 and 4). A main body 1 comprises four horizontal cylinders 2 mounted in two parallel pairs, each pair having two oppositely-situated coaxial cylinders. Each cylinder is preferably provided with a lining which is coated internally with an electrolytic deposit of polished chromium, in order to reduce the friction and the resulting wear to a minimum, and also to eliminate the risk of corrosion. Each cylinder contains a slidable piston 3 which is preferably provided with a plastic packing 4 of leather, natural or synthetic rubber, or any other substance suitable for the liquid in use. The two pistons of each pair of oppositely-situated cylinders are connected together by two rods 5 and 6 which are slidable in fixed guiding sleeves 7 and 8 for the rod 5, and 9 and 10 for the rod 6 (Figs. 4 and 5). Each pair of the said sleeves is preferably provided with two circular rows of balls 11 and 12 contained in a case 13, in order too reduce the mechanical resistance to a minimum (Fig. 5).

Each piston is provided with a roller 14 which is advantageously mounted on a ball bearing, and the rollers of each pair of pistons act upon a cam 15 of special form, whose outline is such that the output of a unit which comprises two pairs of pistons and hence two cams displaced by 90° apart, shall be uniform and without cyclic variations, according to known practice, in order that the said units may be coupled together without taking account of the relative angular position of the successive units.

The two cams 15 of the unit are keyed to or integral with a shaft 16 which is perpendicular to the axis of the cylinders and is terminated at both ends by a member 17 having a polygonal outline, each face of the polygon forming preferably a portion of a cylinder whose axis is at right angles to and intersects the axis of the shaft 16 so as to allow angular displacements between the shafts 16 and the tubes 44 without prejudice for the mechanism.

The liquid under pressure is admitted through a conduit 18 (Fig. 1) and enters a funnel-shaped separator 19 in which the speed of the liquid is reduced, whereby the gas bubbles which it may contain are collected and are discharged through an upper vent 20 (Fig. 2) which is controlled by a float-valve 60, according to known practice. From the lower part of the separator, the liquid freed from gas is led to the corresponding measuring unit through a conduit 21, from which it proceeds into a casing 22. From the said casing, it is circulated through the orifices 23, when these are opened by a slide-valve 24, into the corresponding cylinders 2 whose pistons 3 act upon the cam 15, thus rotating the central shaft 16.

The orifice or orifices 23 which communicate with the interior of the valve 24 serve at this time for the discharge of the liquid, which is expelled by the other piston or pistons and is circulated as shown by the arrows in Fig. 3, into the space 25 between the pistons, whence it is discharged to the exterior through a conduit 26 (Fig. 1) connected with the general discharge head 27.

The special flat slide-valve 24 is preferably controlled by a vertical shaft 28 driven from shaft 16 by means of two bevel gear-wheels 29 and 30. The said valve has a square shape, and carries fixedly at its centre a shaft 31 which is rotatable in a crank 32 secured to the upper end of the shaft 28. A gear-wheel 33, which participates in the rotation of the shaft 31 and the valve 24, is in constant engagement with a pinion 34 (Figs. 3, 4, 6), carried at the end of a small intermediate shaft 35 which is rotatable in the crank 32 and which carries at its lower end a pinion 36 in constant engagement with a stationary toothed ring 37 coaxial with the shaft 28. The pinions 34 and 36 on the one hand, and the gears 33 and 37 on the other hand, have the same diameter and number of teeth. In consequence, according to known practice for planetary gearing, the valve 24 will have a circular movement about the shaft 28 but without rotating on its own centre. In particular, all points of the valve will describe equal circular trajectories, and thus the wear will be uniformly distributed upon the working surface, and hence the tightness will be maintained. The valve 24 is movable upon a flat part comprising four orifices 23 which are located on the sides of a square, and each orifice communicates with the outer end of one of the cylinders, respectively.

The said cylinders are closed at their outer end by covers 38 which form part of the distributing conduit. It will be seen from Fig. 4 that the said conduit leads to the lower part of the cylinder, and that the cover 38 is so constructed as to reduce the dead space in the cylinder to a minimum. Accordingly, the current of liquid will draw forward the solid impurities which are thus prevented from accumulating in the cylinder, and on the other hand, the greatly reduced dead space will further the expulsion of any gas bubbles occurring in the cylinder, which expulsion is facilitated by a small orifice 39 in the inner wall of the cover 38 adjacent the upper generatrix of the cylinder.

A shaft 40 extending through a stuffing-box in cover 41 in the upper wall of the casing 22, may serve for the driving of a suitable indicator.

The movable parts such as shafts, piston-rods, guide-sleeves, cams, etc., with the exception of the pistons themselves and the distributing valve, can be assembled and verified outside of the body of the apparatus. For this purpose they are mounted on a frame 42 (Figs. 3 and 5) forming the lower cover of the body of the unit 1. In this way it is possible to remove, check, repair if necessary, and replace the said parts without being obliged to remove any piping. In like manner, the valve 24 can be verified and replaced by removing the cover 41 without disconnecting any of the piping.

Before mounting in place the frame 42, the units are assembled together, preferably by internal bolts 43.

In order to facilitate the mounting and removal of the frame 42, the shafts 16 of the various parts are connected together by connecting means, each of which consists of a tube (Fig. 3) of polygonal section fitting upon the members 17. Each tube 44 comprises a solid wall 45 near one end, and a spring 46 bearing at one end upon the wall 45 and at the other end upon the member 17, serves to hold the tube 44 in place. It is thus seen that a plurality of elementary shafts 16 corresponding to the respective measuring mechanisms are detachably coupled together so that each shaft and its associated parts may be removed from the assembly without disturbing the shafts of the adjacent measuring mechanisms.

It is an easy matter, after removing the covers 38 and the pistons 3, to push the tube 44 against the action of the spring 46 (to the left of Fig. 3) in order to release the member 17 and to lower the frame 42 with all its parts. This operation is facilitated by the cylindrical form of the faces of the member 17.

Although the method of assembling the units by bolts 43 provides for a rigid assemblage, the method of connecting the shafts 16 together will provide for the proper working of the whole device, even on the occurrence of a bending action or a defective alignment.

All of the sections of the piping 18 and 27 and of the separator have the same length as the measuring unit, and thus they can be assembled by flanges 18'—19'—27' and bolts 18"—19"—27" in order to form continuous tubes (Fig. 2).

Both ends of the separator, as well as the end of each of the two heads which is not in use for the flow of the liquid, are closed by bolted end-pieces. It will be observed that it is thus possible to increase the output capacity of a meter already installed, by simply adding extra units.

It will follow from the preceding description that if $p$ is the loss of pressure for one of the units A, B, C traversed by an output $q$, a meter consisting of $n$ units will operate with a loss of pressure $p$ equal to that of a single unit, while producing an output $q \times n$ which is proportional to the number of units.

This will afford a great facility of adaptation, as with a given pressure, which may at times be too low for the operation of known meters it will always be possible to obtain any desired output, without limitation, simply by forming the meter by means of a sufficient number of units. Another important advantage afforded by the invention is the possibility of keeping up a great number of meters having different capacities exactly adapted to each case, by means of a small number of spare parts.

Finally, the construction of the apparatus, which is confined to a small number of different parts, may be carried out on a high production basis, and provides for the use of improved tool outfit and process which assure a most approved manufacture with a minimum cost.

As each unit comprises an outgoing shaft 40, it is possible to operate several indicating devices. As will be seen in Figures 2 and 3, the present invention is constituted by the juxtaposition of a series of measuring mechanisms which jointly operate a normal indicator or registering mechanism (not shown) which may be attached to any one of the shafts 49. It is of considerable advantage to use a single indicator or registering mechanism for the whole of these assembled elementary meters rather than a plurality of small indicators or registering mechanisms individual to each meter.

I claim:

1. A volumetric liquid meter comprising a liquid supplying conduit, a liquid discharge conduit and a number of identical adjacent mechanisms, each forming a complete volumetric measuring mechanism provided with a rotatable shaft, the shafts of said mechanisms being aligned, and detachable coupling means slidable axially of said shafts for connecting together the shafts of said identical mechanisms, whereby said shafts are adapted to rotate in unison, detachable means for connecting the inlets of said units in parallel with said supplying conduit and detachable means for connecting the outlets of said mechanisms in parallel with said discharge conduit, whereby each mechanism can be withdrawn and replaced, as well as new mechanisms can be added to modify the total capacity.

2. A volumetric liquid meter comprising an inlet manifold, an outlet manifold and a plurality of identical complete measuring mechanisms having substantially similar bodies and means for bolting together said bodies side by side in an aligned position, each of said mechanisms comprising an inlet section, an outlet section and a mechanically operating shaft section, detachable coupling means slidable axially of said sections, said inlet and outlet sections being detachably connected in parallel with said inlet and outlet manifolds whilst said shaft sections are directly connected through said coupling means to turn at the same speed, whereby the total capacity of the meter can be modified by varying at will the number of said assembled mechanisms.

3. A volumetric liquid meter consisting of an inlet manifold, an outlet manifold and a plurality of identical complete measuring mechanisms assembled side by side in an aligned position, each of which comprises bolting means adapted to fix together said mechanisms, an inlet section, an outlet section, said inlet and outlet sections being respectively detachably connected in parallel with said manifolds, a hydraulic piston measuring device, a detachable frame each said device comprising a horizontal shaft mounted in said detachable frame in alignment with similar shafts belonging to adjacent mechanisms, and a power transmitting mechanism operatively connected between said piston measuring device and said shaft and mounted in said detachable frame and a detachable elastic coupling means slidable axially of said shafts for directly connecting each said horizontal shaft with the adjacent shafts, whereby the different metering mechanisms can be at least partially withdrawn from and added to the assembled liquid meter.

4. An apparatus as claimed in claim 1 wherein each said coupling means comprises a tubular element having a polygonal inner surface at its ends, slidably engaging the correspondingly shaped end of said shafts, an inner abutment in said tubular element and a spring mounted within said tubular element between said abutment and the end of one of each pair of adjacent shafts, whereby said shafts can be disconnected by an axial displacement of said tubular elements against the action of said spring.

5. A volumetric flow meter comprising in combination a liquid supplying conduit, a liquid discharge conduit and a number of identical adjacent measuring mechanisms, each comprising a casing having two opposite connecting faces adapted to be in contact with the connecting faces of the adjacent mechanisms in the assembled structure, a shaft section at right angles with said faces, two cams keyed to said shaft section, and two pairs of parallel opposed reciprocating piston units, each pair of piston units cooperating with one of said cams, means for assembling each said measuring mechanism with its shaft section in alignment with the adjacent shaft sections, detachable coupling means slidable axially of said shafts for connecting together said shaft sections whereby the latter are caused to rotate in unison, one shaft section of the composite shaft thus assembled being adapted to drive an indicating mechanism, detachable means for connecting the inlets of said mechanisms in parallel with said supplying conduit and detachable means for connecting the outlets of said mechanisms in parallel with said discharge conduit, whereby each mechanism can be withdrawn and replaced, as well as new mechanisms can be added to modify the total capacity.

HENRI BOUTILLON.

REFERENCES CITED

The following references are of record in the file of this patent:

UNITED STATES PATENTS

| Number | Name | Date |
|---|---|---|
| 38,499 | Parrish | May 12, 1863 |
| 155,280 | Ball et al. | Sept. 22, 1874 |
| 670,146 | Burrell | Mar. 19, 1901 |
| 796,724 | Hewitt | Aug. 8, 1905 |
| 1,076,473 | Wilkinson | Oct. 21, 1913 |
| 1,128,430 | Fetzer | Feb. 16, 1915 |
| 1,128,432 | Fetzer | Feb. 16, 1915 |
| 1,188,606 | Barker et al. | June 27, 1916 |
| 1,287,030 | Jones | Dec. 10, 1918 |
| 1,451,519 | Wilson | Apr. 10, 1923 |
| 1,614,217 | Thompson | Jan. 11, 1927 |
| 1,700,852 | Packard | Feb. 5, 1929 |
| 1,986,747 | Parker | Jan. 1, 1935 |
| 1,999,362 | Jauch et al. | Apr. 30, 1935 |
| 2,085,224 | Krueger | June 29, 1937 |
| 2,097,829 | Bassler | Nov. 2, 1937 |
| 2,120,791 | Schmidt | June 14, 1938 |

FOREIGN PATENTS

| Number | Country | Date |
|---|---|---|
| 322,654 | Germany | July 5, 1920 |
| 546,233 | France | Aug. 17, 1922 |
| 785,355 | France | May 20, 1935 |